United States Patent [19]

Murray et al.

[11] Patent Number: 4,459,857
[45] Date of Patent: Jul. 17, 1984

[54] ELECTROMAGNETIC FLOWMETER

[75] Inventors: Jean P. Murray, Minneapolis; David C. Bohn, Stillwater Township, Washington County; Darroll D. Bengtson, New Brighton, all of Minn.

[73] Assignee: Rosemount Inc., Eden Prairie, Minn.

[21] Appl. No.: 388,953

[22] Filed: Jun. 16, 1982

[51] Int. Cl.³ .............................................. G01F 1/58
[52] U.S. Cl. ................................................. 73/861.12
[58] Field of Search ........... 73/861.11, 861.12, 861.16, 73/861.17

[56] References Cited

U.S. PATENT DOCUMENTS

| | | | |
|---|---|---|---|
| 3,603,146 | 9/1971 | Bennett et al. | 73/861.16 |
| 3,802,263 | 4/1974 | Krechmery et al. | |
| 3,955,413 | 5/1976 | Steele et al. | 73/861.12 |
| 4,309,909 | 1/1982 | Grebe, Jr. et al. | 73/861.12 |
| 4,325,261 | 4/1982 | Freund, Jr. et al. | 73/861.12 |
| 4,346,604 | 8/1982 | Snook et al. | 73/861.12 |
| 4,373,400 | 2/1983 | Sekiguchi | 73/861.12 |

FOREIGN PATENT DOCUMENTS

| | | | |
|---|---|---|---|
| 798997 | 11/1968 | Canada | 73/861.12 |
| 1072521 | 6/1967 | United Kingdom | 73/861.12 |

Primary Examiner—Charles A. Ruehl
Attorney, Agent, or Firm—Kinney & Lange

[57] ABSTRACT

An electromagnetic flowmeter for measuring the flow of an electrically conductive fluid through a flow system comprises a flow tube adapted to be connected in the flow system for allowing the fluid to flow therethrough. Coils supported by the flow tube are energized to provide magnetomotive force to produce a magnetic field, a portion of which interacts with the fluid to produce an electric field within the fluid. Electrodes supported by the flow tube receive signals from the electric field representative of flow. The electrodes are coupled to a signal processing circuit which processes the signals and transmits an output signal representative of flow to suitable readout equipment. At least one magnetomotive force adjusting means, such as a plurality of coil taps or connections that permit changing the number of energized turns in the coils allow selection of a desired magnitude of magnetomotive force to set the magnitude of the magnetic field such that signal variations resulting from manufacturing tolerances of the flow tube, coils and electrodes are substantially compensated for and the signals received by the electrodes are compatible with a calibration range of the signal processing circuit.

16 Claims, 4 Drawing Figures

ELECTROMAGNETIC FLOWMETER

BACKGROUND OF THE INVENTION

Field of the Invention

This invention relates to electromagnetic flowmeters and in particular to apparatus for adjusting the magnetomotive force provided by the flowmeter.

SUMMARY OF THE INVENTION

The present invention comprises an improved electromagnetic flowmeter for measuring the flow of an electrically conductive fluid in a flow system. The flowmeter comprises a flowhead coupled to a signal processing means. The flowhead comprises a flow tube which carries the flow to be sensed, first coil means supported by the flow tube and providing magnetomotive force and thus a magnetic field, and electrode means. The magnetomotive force provided by the first coil means produces a magnetic field, a portion of which interacts with the fluid, producing signals representative of flow. The electrode means receive the signals and are in turn electrically coupled to the signal processing means which processes the signals and transmit an output signal representative of flow. An excitation means is electrically coupled to the first coil means for energization of the first coil means. The improvement comprises an adjusting means coupled to the first coil means for selecting the magnitude of the magnetomotive force.

In one preferred embodiment, the first coil means comprises a plurality of turns of conductive insulated wire. The adjusting means comprises one or more coil taps to which the excitation means can be connected so the energized portion of the first coil means includes a selected number of turns. In this manner, the magnitude of the magnetomotive force and thus the magnetic field is adjusted to a desired value.

One advantage of the present invention is that the adjusting means provides selection of the magnetomotive force which produces the magnetic field with a desired magnitude. Further advantages are apparent from the detailed description of the preferred embodiment of the invention.

DETAILED DESCRIPTION OF THE PREFERRED EMBODIMENTS

Figure 1:
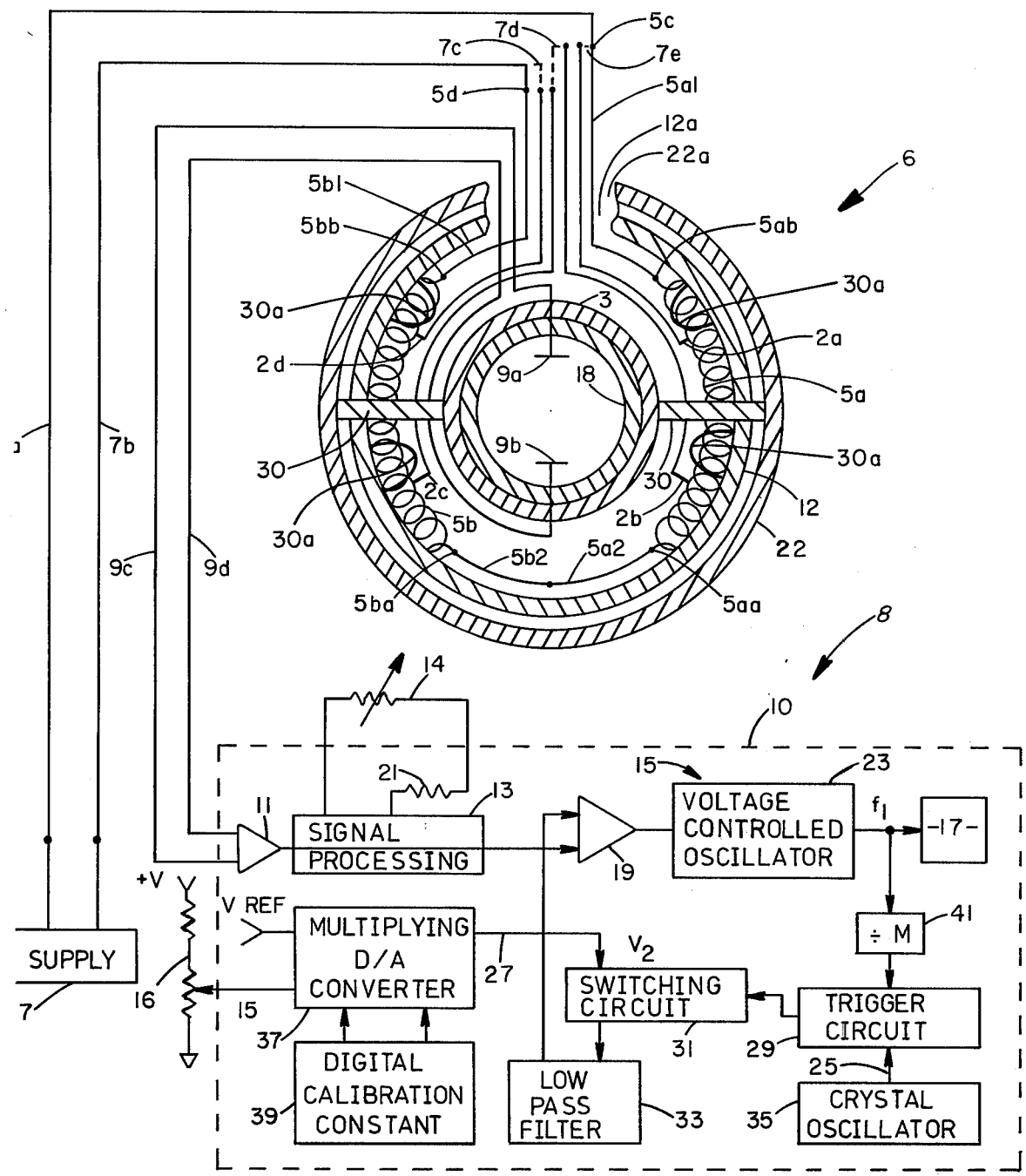
FIG. 1 is a schematic diagram representation of a preferred embodiment of an electromagnetic flowmeter made according to the present invention.

In FIG. 1, a preferred embodiment of an electromagnetic flowmeter comprises a flowhead indicated generally at 6 electrically coupled to signal processing means comprising a signal processing circuit indicated generally at 8, and excitation means 7. Excitation means 7 and signal processing circuit 8 are energized in a conventional manner. Flowhead 6 has an external housing 22 preferably constructed of metal or other suitable material.

Flowhead 6 comprises a flow tube 3 formed of nonmagnetic metal or other suitable material which is preferably cylindrical in shape, for connection in a flow system for passing an electrically conductive fluid therethrough. Housing 22 is supported by flow tube 3 where flow tube 3 is connected in the flow system. A tubular shield 12 preferably conforming to the external shape of flow tube 3 and preferably constructed of a ferromagnetic material longitudinally surrounds and is spaced radially from flow tube 3. Shield 12 is supported by one or more support means 30 affixed to the exterior of flow tube 3 and extending through shield 12. First coil means such as a pair of oppositely disposed coils 5a, 5b are affixed to shield 12 such as by one or more fasteners 30a, and are thereby supported by flow tube 3. Coils 5a, 5b preferably conform in shape to the exterior of flow tube 3. A first end 5aa of coil 5a is coupled to a first end 5ba of coil 5b by two lines 5a2 and 5b2. Excitation means 7 is electrically coupled to a second end 5ab, of coil 5a by lines 7a and 5a1 at a connector 5c and to a second end 5bb of coil 5b by lines 7b and 5b1 at a connector 5d such that coils 5a, 5b when energized by excitation means 7 cooperate to provide a magnetomotive force which produces a magnetic field normal to the fluid flow. Energization of coils 5a, 5b is for example by a pulsed direct current or alternating current signal. Excitation means 7 preferably comprises a pulsed direct current regulated coil drive, but other known supplies can be used by coupling such supplies to connectors 5c, 5d in a known manner. Excitation means 7 and signal processing circuit 8 can be physically spaced from flowhead 6 such that all electronics are substantially isolated from the flow system, which can be subject to vibrations, chemicals, temperature variations and other conditions not compatible with the reliable operation of signal processing circuit 8.

A portion of the magnetic field provided by coils 5a, 5b passes through the fluid. Shield 12 provides a return path for the magnetic field and substantially shields coils 5a, 5b and flow tube 3 from undesired effects of ferromagnetic objects and magnetic fields external thereto. The interaction of the magnetic field provided by coils 5a, 5b and the electrically conductive fluid substantially filling flow tube 3 produces an electric field within the fluid which is representative of the flow of the fluid through flow tube 3. A tubular insulative sleeve 18 preferably constructed of tetrafluoroethylene or other insulative material lines flow tube 3, for fluid to flow through sleeve 18. Electrode means comprising one or more electrodes 9a, 9b are electrically isolated from and supported by flow tube 3 and protrude into the fluid so they are preferably electrically coupled to the fluid. Electrodes 9a, 9b are positioned to receive signals from the electric field resulting from the magnetic field of coils 5a, 5b. When electrically conductive fluid is flowing through sleeve 18 of flow tube 3, the signal sensed by electrodes 9a, 9b is representative of the fluid flow. Certain manufacturing tolerances such as the spacing of electrodes 9a, 9b; the cross sectional area of sleeve 18; the dimensions and relative position of shield 12, flow tube 3, and of coils 5a, 5b; and other factors affect the magnitude of the signal. Such tolerances can lead to substantial variations between signal characteristics of different flowheads 6. Further signal variations occur with the use of different materials and shapes comprising sleeve 18. Selecting the magnitude of the magnetic field by adjustment of magnetomotive force supplied by coils 5a, 5b can substantially compensate for such signal variations, without the need for changing the size or shape of coils 5a, 5b, such that the magnitudes of the signals sensed by electrodes 9a, 9b are within a range compatible with signal processing circuit 8.

A flowhead sensitivity factor F is used to quantify the variations in characteristics between different flowheads 6. The flowhead sensitivity factor is a ratio of the electric field strength E divided by a corresponding volumetric fluid flow rate Q at a nominal energization of coils 5a, 5b, or:

$$F = E/Q \text{ at } I = Io,$$

where I is an electrical current through coils 5a, 5b and Io is a nominal value of such current. Flowheads 6 with smaller or larger than average flowhead sensitivity factors may not be compatible with signal processing circuit 8. One or more magnetomotive force adjusting means 2a, 2b, 2c, 2d which preferably are electric leads tapped into selected turns of coils 5a, 5b are used to select the magnitude of the magnetic field at a known level of energization of coils 5a, 5b by selecting the number of energized turns of coils 5a, 5b or both and thus adjusting the amount of magnetomotive force generated by the first coil means comprising coils 5a and 5b. Such selection of turns is accomplished with use of theoretical information supported by empirical data. Since the electric field strength E is dependent on the magnitude of the magnetic field, the flowhead sensitivity factor is selected by selecting the magnetomotive force. Adjusting means 2a, 2b, 2c 2d permit reduction of variations between the flowhead sensitivity factors of different flowheads 6 such that the magnitudes of the signals received by electrodes 9a, 9b, are within a range compatible with signal processing circuit 8.

Coils 5a, 5b preferably comprise a desired number of turns of insulated electrically conductive wire, however, other coil means will perform satisfactorily. Adjusting means 2a, 2b, 2c, 2d preferably formed of electrically conductive wire are electrically coupled to selected turns of coils 5a, 5b and electrically coupled to excitation means 7 for selecting the number of turns of coils 5a, 5b to be energized. Coil 5a and coil 5b preferably provide equal amounts of magnetomotive force to preserve uniformity of the magnetic field in the fluid. By coupling adjusting means 2a to line 7a by a broken line 7e and coupling adjusting means 2d to line 7b by a broken line 7c, and disconnecting lines 5a1 and 5b1 from connectors 5c and 5d, the number of energized turns is reduced. Further reduction is achieved by coupling adjusting means 2b to adjusting means 2c by a broken line 7d, and disconnecting lines 5b2 and 5a2 from each other. The above couplings and other couplings recognizable by those skilled in the art effectively eliminate turns from being energized. The coupling, as will be explained is normally done by direct connection during manufacture. Feedthrough means such as an opening 12a in shield 12 and an opening 22a in housing 22 aligned with opening 12a permit lines to pass to the exterior of housing 22. Shield 12 should remain in place when adjusting means 2a, 2b, 2c, 2d are being used to adjust the magnetomotive force because the magnetic field magnitude is dependent on the physical location of shield 12.

As explained, the magnitude of the magnetic field provided by coils 5a, 5b is affected by manufacturing tolerances and other factors. Since such magnitude is proportional to the number of energized turns, by selecting a desired number of energized turns during manufacture, the flowhead sensitivity factor is brought within acceptable limits without the need for adjustment of flowhead 6 in the field. Coils 5a, 5b can be adjusted without being coupled to signal processing circuit 8 by utilization of factory calibration instruments. Signal processing circuit 8 can be assembled at a factory other than the factory where flowheads 6 are assembled such that the first coupling of signal processing circuit 8 and flowhead 6 is at an operational installation such as the fluid flow site.

Figure 2:
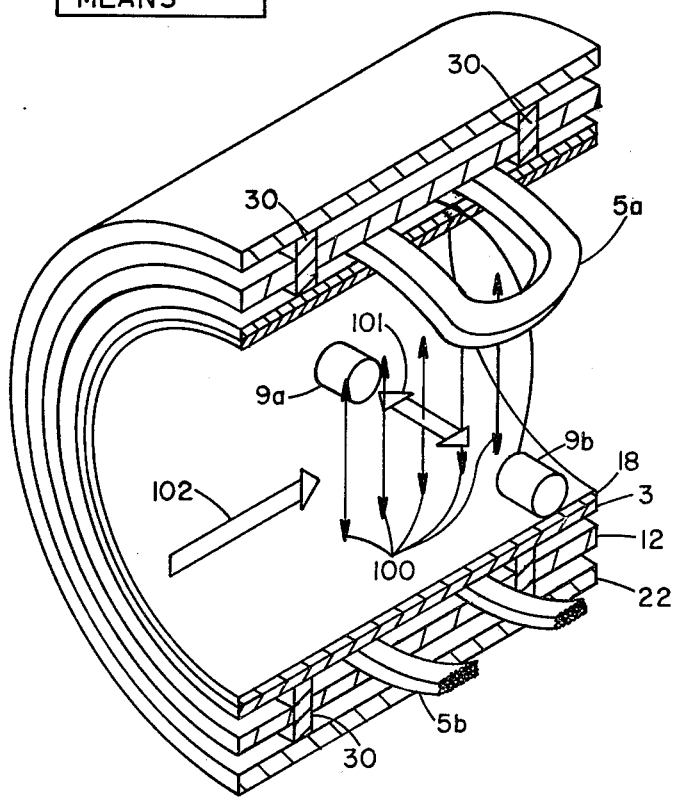
FIG. 2 is a perspective representation view of a flowhead from the flowmeter of FIG. 1.

In FIG. 2, wherein the numbering is consistent with FIG. 1, first coil means, comprising coils 5a, 5b are preferably wound to substantially conform in shape to the external surface of flow tube 3. The physical location and orientation of coils 5a, 5b in FIG. 2 is more representative of the preferred embodiment than that in FIG. 1. The magnetic field provided by coils 5a, 5b is represented by a plurality of lines 100 and is substantially normal to an arrow 101 drawn between electrodes 9a, 9b and an arrow 102 which represents a direction of fluid flow.

In FIG. 1, electrodes 9a, 9b are electrically coupled to signal processing circuit 8 by lines 9c and 9d respectively. A circuit common of signal processing circuit 8 is connected to flow tube 3 which in turn is electrically coupled to the conductive fluid. Signal processing circuit 8 processes the signal from electrodes 9a, 9b which is representative of fluid flow. Broken line 10 encloses a portion of signal processing circuit 8 disclosed by U.S. Pat. No. 4,309,909 which is incorporated herein by reference. Signal processing chain 13 of signal processing circuit 8 comprises an automatic zeroing system as disclosed by U.S. Pat. No. 4,262,543 which is also incorporated herein by reference. Certain circuit differences are noted from both of those patents herein. Signal processing chain 13 comprises a preferred automatic zeroing system of U.S. Pat. No. 4,262,543 which comprises a first operational amplifier 19 (not shown) with a feedback loop comprising a resistor 21 coupled between the ouput and the inverting terminal of first operational amplifier 19. A variable feedback resistor 14 has been added in series with resistor 21 in the feedback loop for setting the gain of first operational amplifier 19. Signal processing circuit 8 also comprises a standard multiplying digital-to-analog converter 37 comprising DAC-08 obtained from Precision Monolithics Inc. of Santa Clara, Calif., and a set of digital switches 39 also known as a switch control means. Pin 15 of the DAC-08 converter is now electrically coupled to a conventional adjustable voltage divider 16 for calibration of digital-to-analog converter 37. Feedback resistor 14 and divider 16 allow for factory calibration of signal processing circuit 8.

Calibration of signal processing circuit 8 for a particular flowhead 6 is simplified by digital switches 39 which preferably comprise a manually programmable set of digital switches and resistors as disclosed by U.S. Pat. No. 4,309,909. A 240008G switch obtained from Eeco, Inc., of Phoenix, Ariz. is preferably used. Digital switches 39 are set to calibrate for the flowhead sensitivity factor of flowhead 6. A factory determined switch setting number is provided with each flowhead 6 such that flowheads 6 with different flowhead sensitivity factors are interchangeable with signal processing circuit 8 with calibration achieved merely by setting digital switches 39 to the switch setting number of such flowhead 6. Thus calibration after replacing flowhead 6 or signal processing circuit 8 is accomplished without the need for instruments, insertion of new components, energization of signal processing circuit 8 or adjustment of the number of energized turns of coils 5a, 5b in the field.

Figure 3:
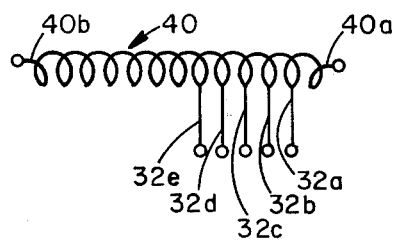
FIG. 3 is a schematic diagram representation of a modified form of a coil used in the flowmeter of FIGS. 1 and 2 with a plurality of coil taps.

Referring to FIG. 3 in another preferred embodiment, a plurality of magnetomotive force adjusting means 32a, 32b, 32c, 32d 32e comprising coil taps are electrically coupled to selected turns of a coil 40 to provide the capability for a more precise selection of magnetomotive force and magnetic field magnitude. Two coils 40 can be coupled to replace coils 5a, 5b of FIG. 1 in a known manner. The only difference between coil 40 and coils 5a, 5b is that coil 40 permits a more precise selection of magnetomotive force by reason of more adjusting means 32a, 32b, 32c, 32d, 32e. Adjusting means 32a, 32b, 32c 32d, 32e can be provided such that portions, such as single turns of coil 40 can be energized or not energized. When adjusting means 32a is coupled to excitation means 7 no current flows in the turns between adjusting means 32a and a first end 40a thus decreasing the amount of magnetomotive force provided by coil 40. Similar couplings between adjusting means 32a, 32b, 32c, 32d, 32e and excitation means 7 or a second coil can divert current from turns of coil 40 either at first end 40a or a second end 40b. Because the magnitude of the magnetic field is proportional to the number of energized turns, and the flowhead sensitivity factor can be controlled by selecting the magnitude of the magnetic field, adjusting means 32a, 32b, 32c, 32d, 32e permit flowheads 6 to be calibrated during manufacture to provide a standard signal for a given flow. Each signal processing circuit 8 can then be set in the factory such that signal processing circuit 8 and flowheads 6 are interchangeable without further calibration.

Figure 4:
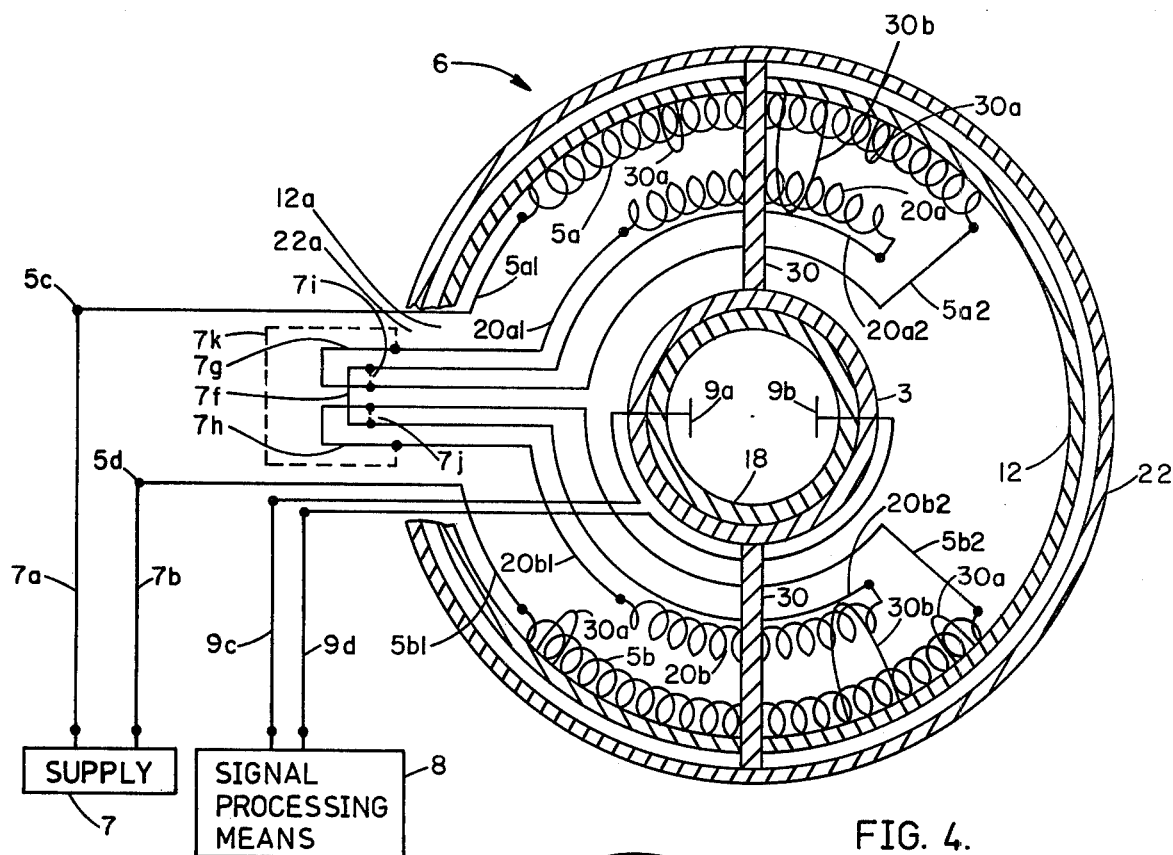
FIG. 4 is a schematic diagram representation of a further preferred embodiment of the electromagnetic flowmeter of FIGS. 1 and 2.

Referring to FIG. 4 wherein the numbering is consistent with FIG. 1, in a further preferred embodiment, the adjusting means comprises second coil means comprising coils 20a, 20b affixed to shield 12 such as by one or more fasteners 30b and thereby supported by flow tube 3. Coils 20a, 20b are placed in a known manner to not substantially adversely affect magnetic field uniformity, and when energized, provide magnetomotive force which produces a magnetic field, a portion of which passes through the fluid in flow tube 3. Coils 20a, 20b can be selectively electrically coupled using four lines 20a1, 20a2, 20b1 and 20b2 to coils 5a, 5b. When coils 20a, 20b are coupled to coils 5a, 5b in series-force aiding by coupling lines 5a1 to 7a, 20a1 to 5a2 by line 7g, 20a2 to 20b2 by line 7f, 20b1 to 5b2 by line 7h, and 5b1 to 7b, the additional magnetomotive force provided by coils 20a, 20b increases the magnetic field magnitude and hence increases the magnitude of the signal sensed by electrodes 9a, 9b. When coupled in series-force opposing by coupling lines 5a1 to 7a, 5a2 to 20a2 by broken line 7i, 20a1 to 20b1, by broken line 7k, 20b2 to 5b2 by broken line 7j, and 5b1 to 7b, and removing lines 7f, 7g, and 7h, the magnetomotive force provided by coils 20a, 20b decreases the magnetic field magnitude and hence decreases the magnitude of the signal received by electrodes 9a, 9b.

The amount of the increase or decrease in magnetic field magnitude is dependent upon the number of turns of wire in coils 20a, 20b. With known or expected manufacturing tolerances, the flowhead sensitivity factor variations are estimated and the number of turns comprising coils 20a, 20b are selected to allow sufficient selection of magnetic field magnitude to compensate for such tolerances. With electrically conductive fluid flowing through flowhead 6, the flowhead sensitivity factor can be selected by coupling or uncoupling coils 20a, 20b to or from coils 5a, 5b respectively such that the signal sensed by electrodes 9a, 9b substantially represents the actual fluid flow. The switch setting number is then calculated and affixed to flowhead 6 such that digital switches 39 can be set to compensate for the flowhead sensitivity factor.

Coil taps (not shown) can also be provided to turns of coils 20a, 20b to provide two levels of adjustment. Coil portions, such as single turns of coils 20a, 20b can be energized or not energized. The first level of adjustment comprises coupling coils 20a, 20b to coils 5a, 5b to be series-force aiding or series-force opposing while the second level comprises selection of coil taps at individual turns of coils 20a, 20b to provide even greater selectivity of magnetomotive force thus providing for signal magnitudes compatible with the reliable operation of signal processing circuit 8. A third level of adjustment can be attained by coil taps on coils 5a, 5b as in FIG. 1 in addition to the two levels above.

One advantage of the preferred embodiments of the present invention is that the adjustability of the magnetomotive force provided allows reduction of deviations in the flowhead sensitivity factor which provides increased accuracy of the flowmeter. Digital switches 39 provide a set number of switch settings for calibration of signal processing circuit 8. Therefore, the optimum calibration of signal processing circuit 8 desired may fall between two successive switch settings resulting in deviation from such calibration. The difference in calibration between successive switch settings depends upon the total range of flowhead sensitivity factors for which digital switches 39 must calibrate signal processing circuit 8. Reducing the range of flowhead sensitivity factors allows reduction of the total range of calibration digital switches 39 must provide which for a given quantity of switch settings results in smaller differences in calibration between successive switch settings. This results in increased accuracy of the flowmeter because the possible deviation from optimum calibration desired for flowhead sensitivity factors is reduced. Because manufacturing tolerances are substantially compensated for, manufacturing costs can be reduced without loss of accuracy of the flowmeter.

In addition to increased accuracy, the present invention permits easy interchangeability of flowheads 6 and signal processing circuit 8 in the field with simple calibration therefor. No test apparatus or instruments are required for such calibration. Flowheads 6 are calibrated as in a factory of origin and provided with the switch setting number necessary for compatibility with signal processing circuit 8 which can be manufactured in a different factory. Upon installation or replacement of flowhead 6 or signal processing means 8, the only calibration in the field necessary is the simple setting of switches comprising digital switches 39 of signal processing circuit 8 to the switch setting number of flowhead 6. The flowmeter is then fully calibrated.

While the instant invention has been described by reference to preferred embodiments, those skilled in the art recognize that changes in form and detail may be made without departing from the spirit or scope of the invention.

What is claimed is:

1. An improved electromagnetic flowmeter energized in a known manner for measuring the flow of a fluid therethrough of the type having
    a flow tube adapted to be connected in a flow system for allowing the flow of the fluid therethrough,
    first coil means having a plurality of truns of insulated electrically conductive wire supported by the flow tube for providing magnetomotive force which produces a magnetic field, a portion of which interacts with the fluid flowing through the flow tube producing signals representative of the flow,
    electrode means supported by the flow tube and coupled to the fluid for receiving the signals,
    signal processing means electrically coupled to the electrode means for processing the signals and for producing an output signal representative of flow,
    excitation means electrically coupled to the first coil means for energization of the first coil means, and
    adjusting means coupled to the excitation means and to selected turns of the first coil means for selecting the number of turns effectively coupled to the excitation means for adjusting the magnitude of the magnetomotive force supplied by the first coil means.

2. The improved electromagnetic flowmeter of claim 1 wherein the adjusting means further comprises tap means coupled to said selected turns of the first coil means for selecting the number of turns of the first coil means energized by the excitation means.

3. The improved electromagnetic flowmeter of claim 1, wherein the signal processing means has a calibration range and wherein the adjusting means permits a calibration of the flow tube within a range compatible with the calibration range of the signal processing means.

4. The improved electromagnetic flowmeter of claim 1, and means for holding components comprising the flow tube, first coil means and the electrode means in a flowmeter assembly, each flowmeter assembly having a flow sensitivity factor dependent upon manufacturing tolerances of the means for holding and the components, which factor is calculated as a calibration switch setting number for each flowmeter assembly.

5. The improved electromagnetic flowmeter of claim 4 wherein the signal processing means further comprises switch control means coupled in circuit with the signal processing means and having means for receiving said switch setting number and for providing a calibration signal to the signal processing means as a function of the switch setting number.

6. The improved electromagnetic flowmeter of claim 1 wherein the excitation means is a pulsed direct current regulated coil drive.

7. The improved electromagnetic flowmeter of claim 1 further comprising shielding means supported by the flow tube and coupled to the magnetic field for providing a return path for the magnetic field.

8. The improved electromagnetic flowmeter of claim 7 wherein the shielding means is constructed of a ferromagnetic material.

9. The improved electromagnetic flowmeter of claim 8 wherein the shielding means substantially shields the fluid in the flow tube from undesired magnetic fields.

10. The improved electromagnetic flowmeter of claim 7 wherein the adjusting means extends external to the shielding means such that adjustment of the magnetomotive force is accomplished external to the shielding means.

11. The improved electromagnetic flowmeter of claim 1 wherein the signal processing means is physically spaced from the flow system such that the output signal is substantially unaffected by conditions not compatible with the reliable operation of the signal processing means.

12. An improved electromagnetic flowmeter energized in a known manner for measuring the flow of a fluid therethrough of the type having
    a flow tube adapted to be connected in a flow system for allowing the flow of the fluid therethrough,
    first coil means comprising a plurality of turns nonadjustably supported by the flow tube, said first coil means having terminals for coupling to a power supply for providing magnetomotive force which produces a magnetic field, a portion of which field interacts with the fluid flowing through the flow tube for producing signals representative of the flow,
    electrode means supported by the flow tube and coupled to the fluid for receiving the signals,
    signal processing means electrically coupled to the electrode means for processing the signals and for producing an output signal respresentative of flow, and
    adjusting means coupled to the first coil means for permitting selection of the effective number of turns comprising the first coil means for thereby selecting the magnitude of the magnetomotive force supplied by the first coil means.

13. The improved electromagnetic flowmeter of claim 12 wherein the adjusting means further comprises tap means coupled to selected turns of the first coil means for selecting the number of turns of the first coil means energized when the terminals are coupled to a power supply.

14. An improved electromagnetic flowmeter energized in a known manner for measuring the flow of a fluid therethrough of the type having
    a flow tube adapted to be connected in a flow system for allowing the flow of the fluid therethrough,
    first coil means supported by the flow tube for providing magnetomotive force which produces a magnetic field, a portion of which interacts with the fluid flowing through the flow tube for producing signals representative of the flow, the first coil means including a first coil section and a second coil section,
    electrode means supported by the flow tube and coupled to the fluid for receiving the signals,
    signal processing means electrically coupled to the electrode means for processing the signals and for producing an output signal representative of flow,
    excitation means electrically coupled to the first coil means for energization of the first coil means, and
    means coupled to the excitation means and to the second coil section of the first coil means for coupling and uncoupling the second coil section to the excitation means permitting selection of the magnitude of the magnetomotive force supplied by the first coil means.

15. The improved electromagnetic flowmeter of claim 14 wherein the second coil section is coupled to the first coil section in a series-aiding relationship for increasing the magnitude of the magnetic field.

16. The improved electromagnetic flowmeter of claim 14 wherein the second coil section is coupled to the first coil section in a series-opposing relationship for decreasing the magnitude of the magnetic field.

* * * * *

UNITED STATES PATENT AND TRADEMARK OFFICE
CERTIFICATE OF CORRECTION

PATENT NO. : 4,459,857

DATED : July 17, 1984

INVENTOR(S) : Jean P. Murray et al

It is certified that error appears in the above-identified patent and that said Letters Patent is hereby corrected as shown below:

Column 4, line 19, after "preferred" remove the semi-colon --;--. Column 7, line 7, (Claim 1, line 6), "truns" should be --turns--. Column 8, line 23, (Claim 12, line 18), "respresentative" should be --representative--.

Signed and Sealed this

Nineteenth Day of February 1985

[SEAL]

Attest:

DONALD J. QUIGG

Attesting Officer     Acting Commissioner of Patents and Trademarks